(12) United States Patent
Sullivan et al.

(10) Patent No.: US 7,538,524 B2
(45) Date of Patent: May 26, 2009

(54) GENERATORS AND TRANSFORMERS WITH TOROIDALLY WOUND STATOR WINDING

(75) Inventors: Steven L. Sullivan, Odessa, FL (US);
David L. Goulet, Clearwater, FL (US);
Donald Hofmann, St. Petersburg, FL (US)

(73) Assignee: Omnidyne, Inc., Clearwater, FL (US)

( * ) Notice: Subject to any disclaimer, the term of this patent is extended or adjusted under 35 U.S.C. 154(b) by 0 days.

(21) Appl. No.: 10/171,262

(22) Filed: Jun. 13, 2002

(65) Prior Publication Data

US 2003/0025416 A1 Feb. 6, 2003

Related U.S. Application Data

(62) Division of application No. 09/503,188, filed as application No. PCT/US98/21858 on Oct. 13, 1998, now abandoned.

(60) Provisional application No. 60/062,152, filed on Oct. 16, 1997.

(51) Int. Cl.
*H02P 9/14* (2006.01)
*H02K 3/04* (2006.01)
*H02K 1/00* (2006.01)

(52) U.S. Cl. ............... 322/46; 310/154.01; 310/164; 310/181

(58) Field of Classification Search ............ 322/46, 322/50, 51, 57; 310/164, 181, 162, 156, 310/178, 184, 198, 154.02; 324/174; 31/156.38
See application file for complete search history.

(56) References Cited

U.S. PATENT DOCUMENTS

| | | | | |
|---|---|---|---|---|
| 1,622,145 A * | 3/1927 | Hunt | ............................ | 310/151 |
| 1,929,259 A * | 10/1933 | Rich | ........................ | 324/76.69 |
| 2,128,044 A * | 8/1938 | Grabner | ....................... | 310/190 |
| 2,149,634 A * | 3/1939 | Schweitzer, Jr. | ............. | 361/35 |
| 2,564,320 A * | 8/1951 | Brainard | ....................... | 322/28 |
| 2,767,368 A * | 10/1956 | Kober | .......................... | 322/57 |
| 3,214,727 A | 10/1965 | Brodersen | ................... | 336/135 |

(Continued)

FOREIGN PATENT DOCUMENTS

FR 2603433 * 3/1988

(Continued)

OTHER PUBLICATIONS

Spooner et al., "Motoring Performance of the Toroidal Permanent Magnet Machine", Electrical Machines and Drives, 1991. Fifth International Conference on (Conf. Publ. No. 341), Sep. 11-13, 1991, pp. 36-40.*

(Continued)

*Primary Examiner*—Burton Mullins
(74) *Attorney, Agent, or Firm*—Greenberg Traurig

(57) ABSTRACT

Electrical generators are provided with toroidally wound stator windings electrically connected in series; a high permeability stator core, preferably an amorphous magnetic alloy material, glassy metal or HYPERCO™ 50 laminations; and a rotor. The toroidally wound stator coils and the stator core trap essentially all of the flux fields generated by the stator coils within the stator core. Since there is essentially no magnetic field leaving the stator, there is essentially no flux field interaction with the field generated by the rotor. The reduction of flux field interaction also reduces counter torque.

5 Claims, 13 Drawing Sheets

U.S. PATENT DOCUMENTS

| | | | | |
|---|---|---|---|---|
| 3,344,325 | A | * | 9/1967 | Sklaroff ..................... 318/696 |
| 3,396,325 | A | * | 8/1968 | Hopkins ...................... 322/46 |
| 3,466,518 | A | * | 9/1969 | Veli et al. .................... 318/685 |
| 3,508,094 | A | * | 4/1970 | Byrne ......................... 310/86 |
| 3,671,788 | A | * | 6/1972 | Knudson et al. ....... 310/156.55 |
| 3,858,308 | A | * | 1/1975 | Peterson ..................... 29/598 |
| 3,912,958 | A | | 10/1975 | Steen ......................... 310/168 |
| 4,087,711 | A | | 5/1978 | Kirtley, Jr. et al. .......... 310/184 |
| 4,200,831 | A | | 4/1980 | Weldon et al. ................. 322/8 |
| 4,220,920 | A | | 9/1980 | Gross ......................... 324/442 |
| 4,373,148 | A | | 2/1983 | Gutz ......................... 318/245 |
| 4,392,072 | A | | 7/1983 | Rosenberry ................. 310/216 |
| 4,392,073 | A | | 7/1983 | Rosenberry, Jr. ............ 310/216 |
| 4,499,420 | A | * | 2/1985 | Shiraki et al. ............... 324/174 |
| 4,562,399 | A | * | 12/1985 | Fisher ......................... 322/94 |
| 4,564,778 | A | * | 1/1986 | Yoshida ..................... 310/177 |
| 4,585,984 | A | | 4/1986 | Bessho ....................... 318/750 |
| 4,591,750 | A | | 5/1986 | Major et al. ................. 310/237 |
| 4,642,539 | A | * | 2/1987 | Hinds ......................... 318/439 |
| 4,731,554 | A | | 3/1988 | Hall et al. ................. 310/67 R |
| 4,777,394 | A | | 10/1988 | Hayashi ...................... 310/83 |
| 4,843,270 | A | | 6/1989 | Dijken ....................... 310/208 |
| 4,885,526 | A | * | 12/1989 | Szabo ......................... 322/66 |
| 4,908,347 | A | | 3/1990 | Denk ............................ 505/1 |
| 5,079,467 | A | | 1/1992 | Dorman ..................... 310/156 |
| 5,172,021 | A | | 12/1992 | Takahashi et al. .......... 310/90.5 |
| 5,175,462 | A | * | 12/1992 | Yoshino et al. ............. 310/164 |
| 5,304,883 | A | * | 4/1994 | Denk ......................... 310/180 |
| 5,397,975 | A | * | 3/1995 | Syverson ..................... 322/46 |
| 5,793,136 | A | | 8/1998 | Redzic ....................... 310/114 |
| 5,841,336 | A | | 11/1998 | Rapoport et al. ............ 336/212 |
| 6,933,822 | B2 | * | 8/2005 | Haugs et al. ................ 336/100 |

FOREIGN PATENT DOCUMENTS

| | | | |
|---|---|---|---|
| JP | 61035145 | * | 2/1986 |
| JP | 1536483 A | * | 7/1987 |
| JP | 1-129742 | * | 5/1989 |
| SU | 936253 B | * | 5/1980 |
| WO | 99/19962 | | 4/1999 |

OTHER PUBLICATIONS

Qu et al., "Dual Rotor, Radial Flux, Toroidally-wound, Permanent Magnet Machines" Industry Applications Conference, 2002. 37th IAS Annual Meeting. Conference Record of the , vol. 2, Oct. 13-18, 2002, pp. 1281-1288, vol. 2.*

* cited by examiner

GENERATORS AND TRANSFORMERS WITH TOROIDALLY WOUND STATOR WINDING

This is a divisional of prior application Ser. No. 09/503,188 filed on Feb. 14, 2000 now abandoned, which, in turn, claims the benefit of International Application No. PCT/US98/21858 filed on Oct. 13, 1998, designating the United States, under 35 U.S.C. §365, which, in turn, claims the benefit of U.S. Provisional Application No. 60/062,152 filed on Oct. 16, 1997, under 35 U.S.C. §119(e).

BACKGROUND OF THE INVENTION

1. Field of the Invention

The present invention relates generally to electrical generators and transformers, and more particularly, to generators and transformers with very low levels of stator flux escaping the stator coil and interacting with the flux field generated by the rotor.

2. Related Art

Electrical generators generate electricity by creating a relative motion between the magnetic flux of a rotor and a stator coil. FIG. 1 is a diagram of a conventional single phase AC generator 1. Rotor coil 10 produces a magnetic flux field when a D.C. voltage source (not shown) is connected to contacts 11. The magnetic flux field moves across the stator coils 12 and generates a current flow. The coils are connected in series and an A.C. output is realized across the load 14.

In the conventional generator illustrated in FIG. 1, magnetic flux fields are also generated by the stator coils 12, due to the current flow. Some of the flux generated by the stator coils travels through the stator core 16, and some flux generated by the stator coils leaks outside of the core. The stator flux field, outside of the stator core 16, opposes the flux field generated by the rotor. The opposing flux fields create a counter torque which directly oppose the torque applied by the mechanical input to the rotor coil 10. Because of this, the output capacity of the conventional generators is limited by the torque capacity of the rotor and the shaft used to transmit mechanical energy input to the rotor.

Therefore, there exists a need in the art for an electrical generator with an output capacity which is not limited by the torque capacity of the rotor.

SUMMARY OF THE INVENTION

In accordance with the invention, electrical generators are provided which, among other advantages, have outputs which are not limited by the torque capacity of their rotors and thus overcome the above-mentioned deficiencies in the art.

In one embodiment, the generator includes:

a stator; at least one stator winding toroidally wound about at least a portion of said stator, whereby said rotor produces a current in said at least one stator winding for generating an output; an input shaft; and at least one inner rotor comprising at least one pole, said at least one inner rotor mounted on said input shaft for rotating said rotor, wherein said input shaft and said at least one rotor are located substantially within said stator and are movable relative to said stator.

In another embodiment, the generator includes:

toroidally wound stator windings electrically connected in series; a high permeability stator core, preferably an amorphous magnetic alloy material, glassy metal or HYPERCO™ 50 laminations; and a four pole inner rotor having two north poles directly across from each other and two south poles directly across from each other.

In a preferred embodiment, the generator also includes an outer rotor having its poles aligned with the poles of the inner rotor.

In an alternative embodiment, the inner rotor has six poles and the stator core has three stator coils.

In yet another embodiment, the inner rotor has two poles and the stator core has a single coil wrapped around a portion of the stator core.

An additional embodiment employs three rotors combined on a single shaft to produce a three phase output.

In a D.C. generator embodiment, the rotor is radially magnetized and permanent magnets are attached to the stator core.

In another D.C. embodiment, the rotor has commutating coils connected to a switching circuit operated so that the flux fields leaving the rotor are always traveling in the same direction across the stator coils.

The high efficiency of the generator of the present invention makes it desirable for use in a wide range of electrical generation equipment, including portable electrical generating equipment.

DESCRIPTION OF THE PREFERRED EMBODIMENTS

Figure 1:
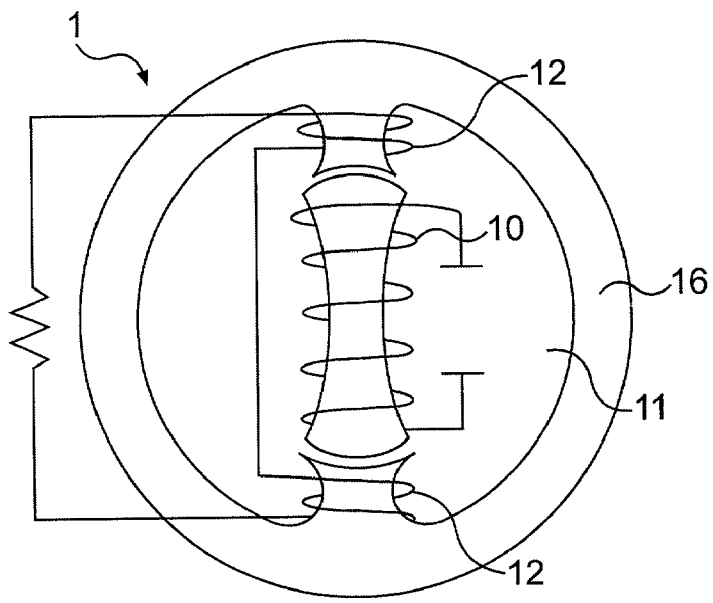
FIG. 1 is a schematic diagram of a conventional A.C. electrical generator.
Figure 2A:
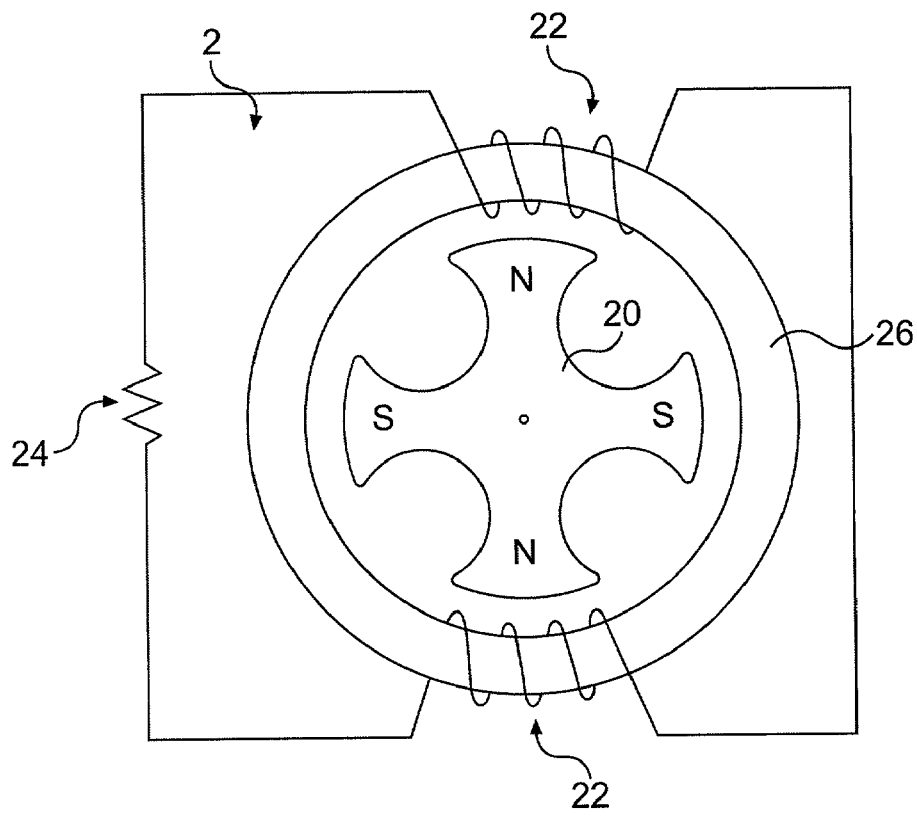
FIG. 2A is a schematic diagram of an A.C. toroidally wound stator generator with two stator coils and a four pole rotor, in accordance with a preferred embodiment of the invention.

FIG. 2A shows a first embodiment of an electrical generator 2, in accordance with the present invention. A prime mover (not shown) rotates the rotor 20 and establishes a rotating magnetic field. The rotor has two north poles and two south poles arranged such that the poles substantially aligned directly across from each other are the same polarity. Because the stator coils 22 are spaced farther from the rotor 20 than in a conventional generator, as shown in FIG. 1, the rotor must be capable of providing a high flux density across a larger air gap. A suitable high flux material is disclosed in U.S. Pat. No. 5,635,889, to Stelter, the disclosure of which is hereby incorporated by reference. In an alternative embodiment, the rotor is formed with commutating windings which are connected to a switching circuit to provide a rotating magnetic field without any moving parts.

The relative motion of the magnetic field generated by the rotor 20, with respect to the stator coils 22, creates a current flow in the stator coils and an A.C. output across the load 24. Stator coils 22 are toroidally wound around the stator core 26. The number of turns and type of material used for the stator coils 26 are determined based on the desired application. Such determinations are well known to those of ordinary skill in the art. In a preferred embodiment, the conductors forming the stator coils are made out of superconducting material. Toroidally winding the stator coils 22 eliminates the need for slots in the stator assembly and the associated problem of inserting windings in the narrow slot openings on the inside diameter of the stator.

The stator coils 22 also create a magnetic field when current is flowing through them. Because the stator coils 22 are electrically connected in series and the rotor 20 is configured such that poles of the same polarity move across the coils at the same time, the current flow within the stator coils 22 causes the magnetic flux fields within the core 26 to aid one another. The flux paths within the stator core 26 alternate in synch and travel in the same direction.

The stator core 26 is formed of a magnetic material with minimum power loss. Preferable structures include laminates of nickel, iron and zinc or a suitable powder metal matrix. Nickel-iron alloys are also preferable because of their high permeability and low hysteresis losses. Amorphous magnetic alloy materials, glassy metals, and HYPERCO™ 50 laminations are even more preferable stator core 26 materials because of their ability to reduce eddy currents to an acceptable level.

The toroidally wound stator coils 22 and the stator core 26 trap essentially all of the flux fields generated by the stator coils within the stator core. Since there is essentially no magnetic field leaving the stator 26, there is substantially no flux field interaction with the field generated by the rotor 20. The elimination of flux field interaction also eliminates counter torque. Therefore, the output capacity of the generator of the invention is limited by the current carrying capacity of the stator coils 22 and not the torque capacity of the rotor 20 as in the prior art. However, the torque capacity of the rotor 20 must be sufficient to overcome the losses due to friction and any minor counter torque due to minor flux leakage from the stator core 26 since some minor amount of flux leakage may occur.

Figure 2B:
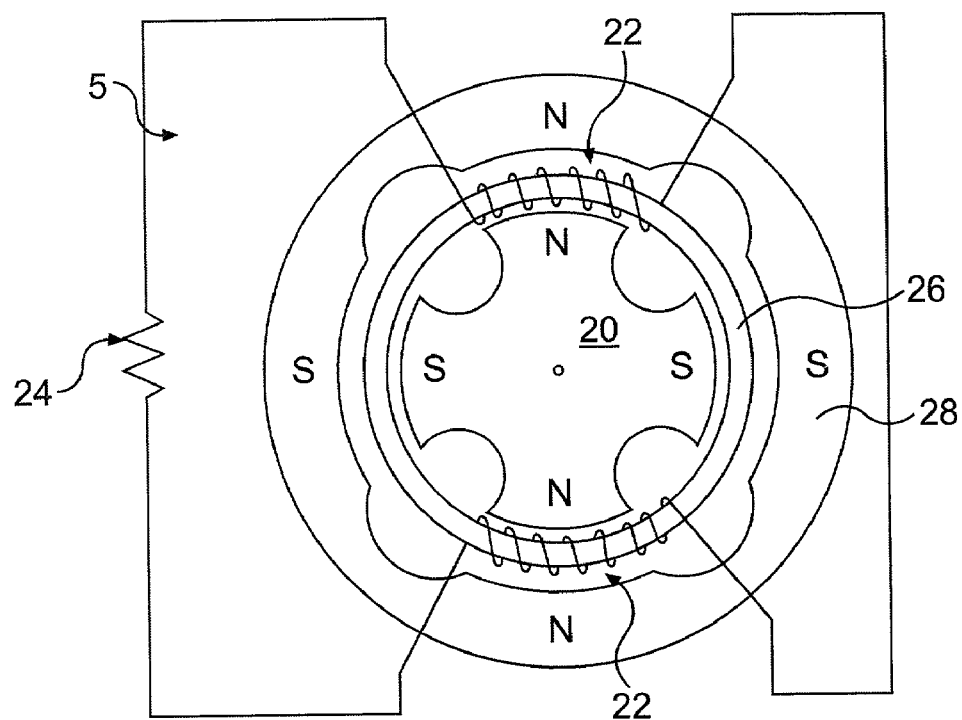
FIG. 2B is a schematic diagram of an A.C. toroidally wound stator generator with two stator coils and two rotors, each having four poles, in accordance with a preferred embodiment of the invention.

A preferred embodiment of a single phase A.C. generator is illustrated in FIG. 2B. Generator 5 is similar to generator 2, shown in FIG. 2A. Like elements are labeled the same throughout the several views. Generator 5 differs from generator 2 in that it includes an outer rotor 28. The poles of the outer rotor 28 are aligned with the poles of the rotor 20. Rotors 20 and 28 are synchronized to rotate together so that their flux fields aid one another. Generator 5 also traps essentially all of the flux fields generated by the stator coils 22 within the stator core 26, with the resultant elimination of counter torque on rotor 20 due to flux from stator coil 26.

Figure 3:
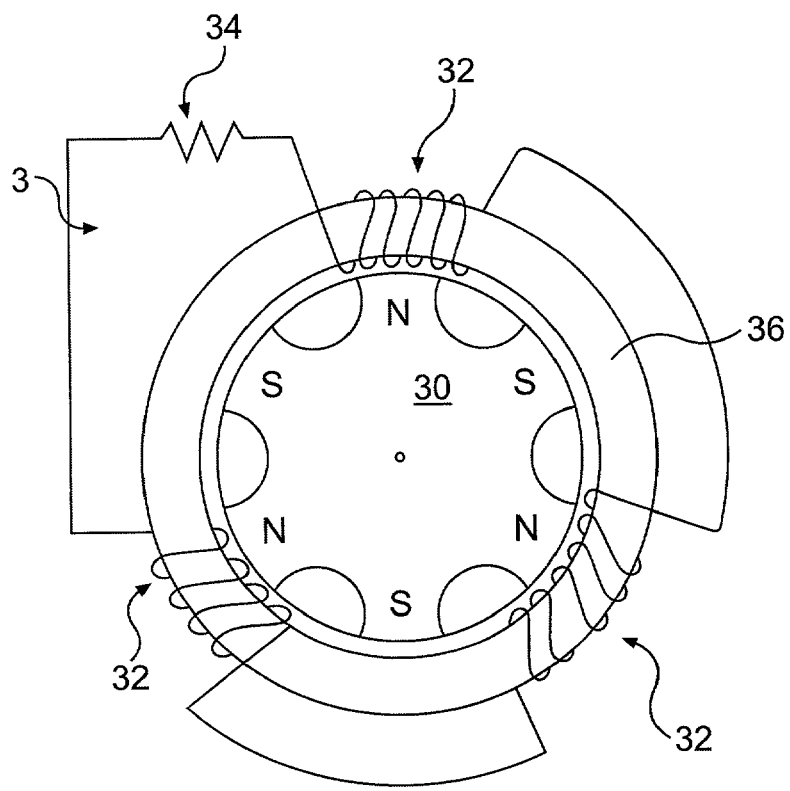
FIG. 3 is a schematic diagram of an A.C. toroidally wound stator generator with three stator coils and a six pole rotor, in accordance with another preferred embodiment of the invention.

The present invention is not limited to A.C. generators having four poles and two stator coils. FIG. 3 illustrates an alternative embodiment of a single phase A.C. generator 3 in accordance with the present invention. Referring to FIG. 3, a six pole rotor 30 having three north poles and three south poles is located within the stator core 36. Three toroidally wound stator coils 32 are wrapped around the stator core 36. Generator 3 operates according to the same principles as generator 2. The difference is that the A.C. output across the load 34 has a higher frequency and amplitude than the output across the load 24, shown in FIG. 2A.

Figure 4:
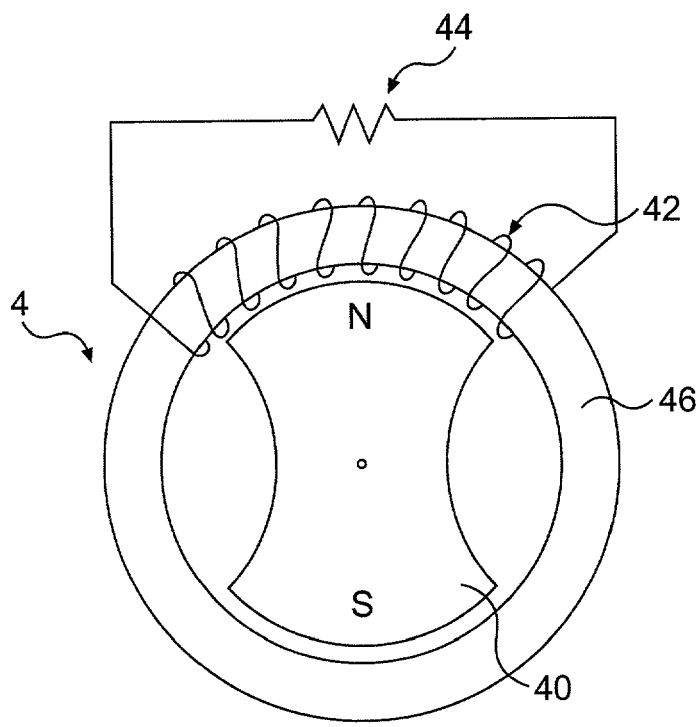
FIG. 4 is a schematic diagram of an A.C. toroidally wound stator generator with a single stator coil and a two pole rotor in accordance with a preferred embodiment of the invention.

Another embodiment of a single phase A.C. generator 4 is illustrated in FIG. 4. Referring to FIG. 4, a two pole rotor 40 having a north pole and a south pole is located within the stator core 46. In this embodiment, a single toroidally wound stator coil 42 is —wrapped around a portion of the—stator core 46. Generator 4 also operates according to the same principles as generator 2. The difference in this embodiment is that the A.C. output across the load 44 has a lower frequency and amplitude than the output across the load 24, shown in FIG. 2A. Based on the teachings in this disclosure, one of ordinary skill in the art can optimize the number of rotor poles and stator coils for the frequency and amplitude desired.

Figure 5:
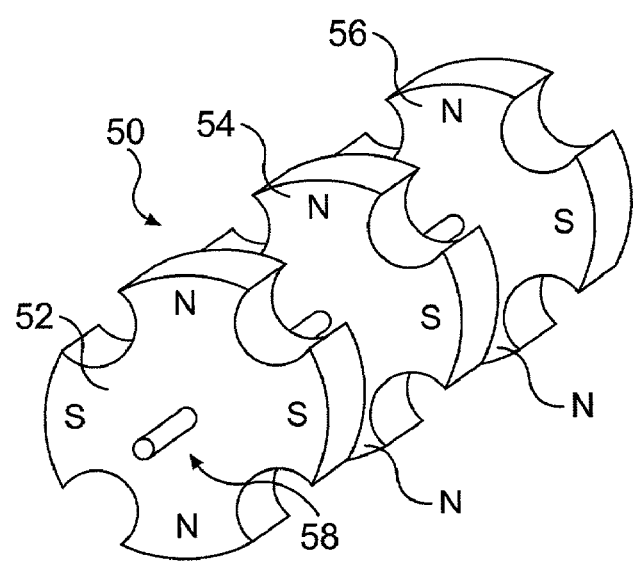
FIG. 5 is a view of a rotor used in a three-phase toroidally wound stator generator in accordance with another embodiment of the invention.

The present invention is also not limited to single phase A.C. generators. FIG. 5 illustrates a rotor assembly 50 having three rotors 52, 54 and 56 combined on a single shaft 58, for use in a three phase A.C. generator embodiment. Since the rotors 52, 54 and 56 are aligned, the stator coils (not shown) must be successively displaced from each other by 120'. Like the other embodiments, the stator coils are toroidally wound around the stator core (not shown). The stator coils are wired in either a conventional delta or wye configuration. In another embodiment, the stator coils are aligned and rotors 52, 54 and 56 are successively displaced by 120°.

Figure 6:
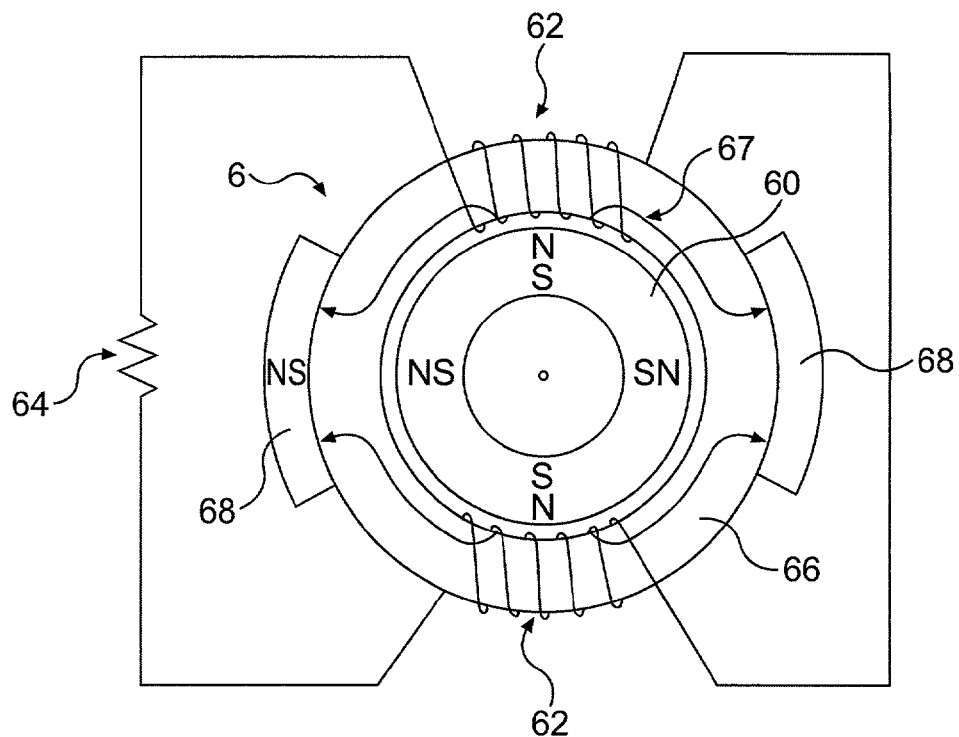
FIG. 6 is a schematic diagram of a D.C. toroidally wound stator generator with permanent magnets attached to the stator core.

A first embodiment of a D.C. generator 6 is illustrated in FIG. 6. Rotor 60 is radially magnetized with an outer north pole and an inner south pole. The rotor 60 produces flux fields 67 which cut across stator coils 62. Like the other embodiments, the stator coils 62 are toroidally wound around stator core 66. The flux fields 67 cross the stator coils 62 in the same direction at all times, as indicated in FIG. 6, and create a current flow in the stator coils 62. Because the flux fields 67 cross the stator coils in a single direction, a D.C. output is created across load 64. Permanent magnets 68 are necessary to provide a return path for the flux fields 67. In another preferred embodiment (not shown), the permanent magnets are placed with the stator core, along either the edge of the stator core closest to the rotor or the edge farthest from the rotor.

The current flow in the stator coils 62 also produces a magnetic field. Like the other embodiments, the toroidally wound stator coils 62 and the stator core 66 trap essentially all of the flux fields generated by the stator coils within the stator core. Since no flux field leaves the stator core 66, there is no flux field interaction with the flux field 67 created by the rotor 60 and therefore no counter torque.

Figure 7:
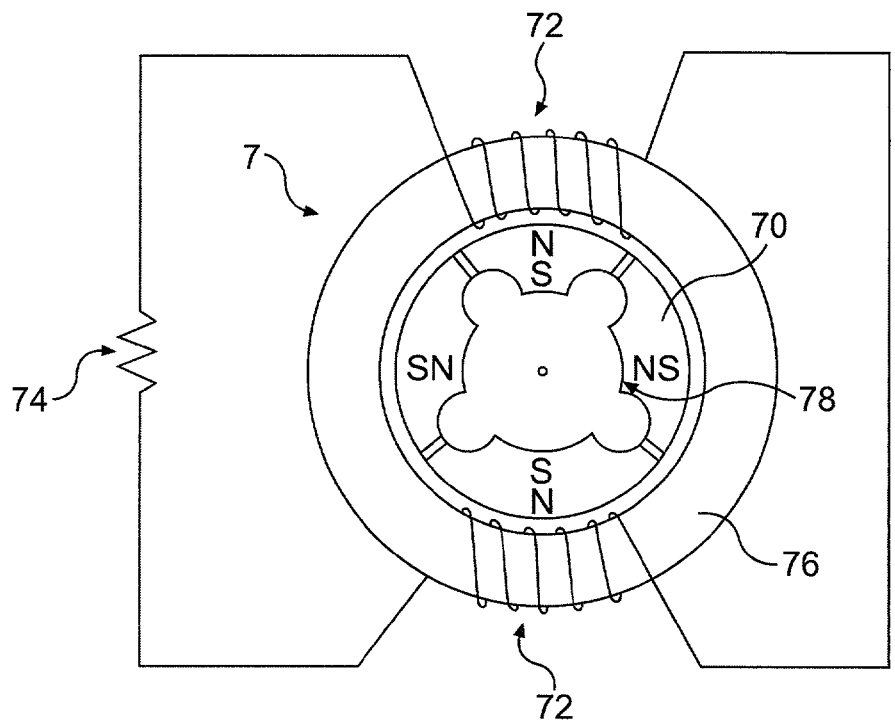
FIG. 7 is a schematic diagram of a D.C. toroidally wound stator generator having a rotor formed of electromagnets.

Another embodiment of a D.C. generator 7 is illustrated in FIG. 7.

Rotor 70 includes four slots 78 which have commutating coils (not shown) wrapped around. A switching circuit (not shown) controls the direction of current through the commutating coils, as the rotor 70 rotates, so that flux fields leaving the rotor 70 are always traveling in the same direction across the stator coils 72. It is preferred that the commutating coils are switched such that north poles of the rotor 70 are always across from the stator coils 72, as shown in FIG. 7.

The flux fields cross the stator coils in a single direction which results in a D.C. output across load 74. Generator 7 also has the stator coils 72 toroidally wound around stator core 76. Counter torque is eliminated due to the lack of flux field interaction, as described in the previous embodiments.

Figure 8:
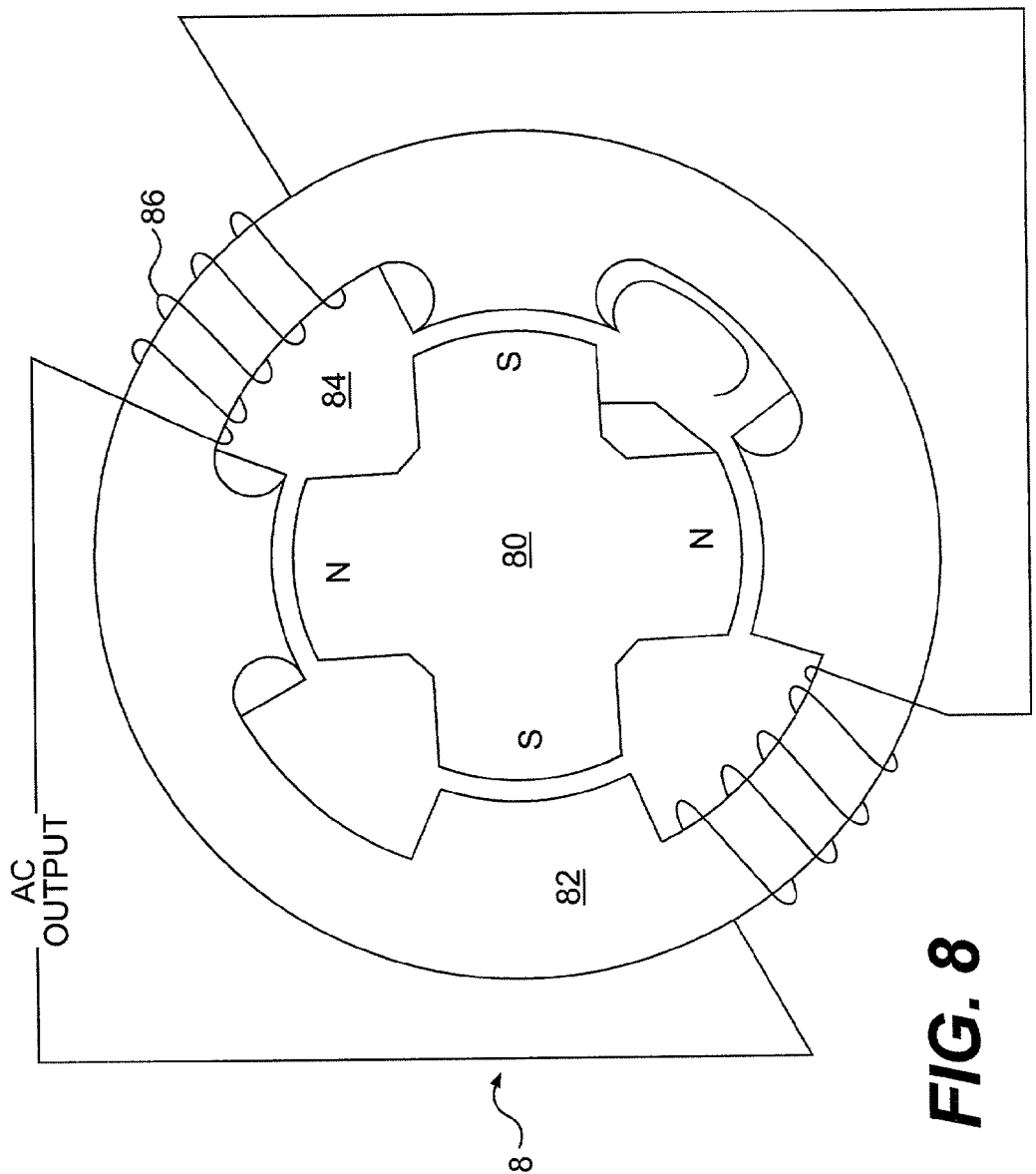
FIG. 8 is a schematic diagram of an A.C. toroidally wound stator generator with two stator coils and a four pole rotor in accordance with a preferred embodiment of the invention.

Another embodiment of the invention is shown in FIG. 8. Generator 8 includes a rotor 80 is located within a stator core 82. Rotor 80 has two north poles and two south poles arranged such that the poles of the same polarity are substantially aligned directly across from each other. Stator core 82 has an inner periphery provided with four inner slots 84. Two stator windings 86 are wound around two of inner slots 84. This generator operates according to the same principles of the generator shown in FIG. 2A except that it produces a different A.C. output. Based on the teachings in this disclosure, one of ordinary skill in the art can optimize, for example, the number of inner slots, stator windings, and poles for the output desired. This embodiment permits a greater amount of stator windings 86 per unit area while maintaining a relatively large air gap between rotor 80 stator core 82.

Figure 9:
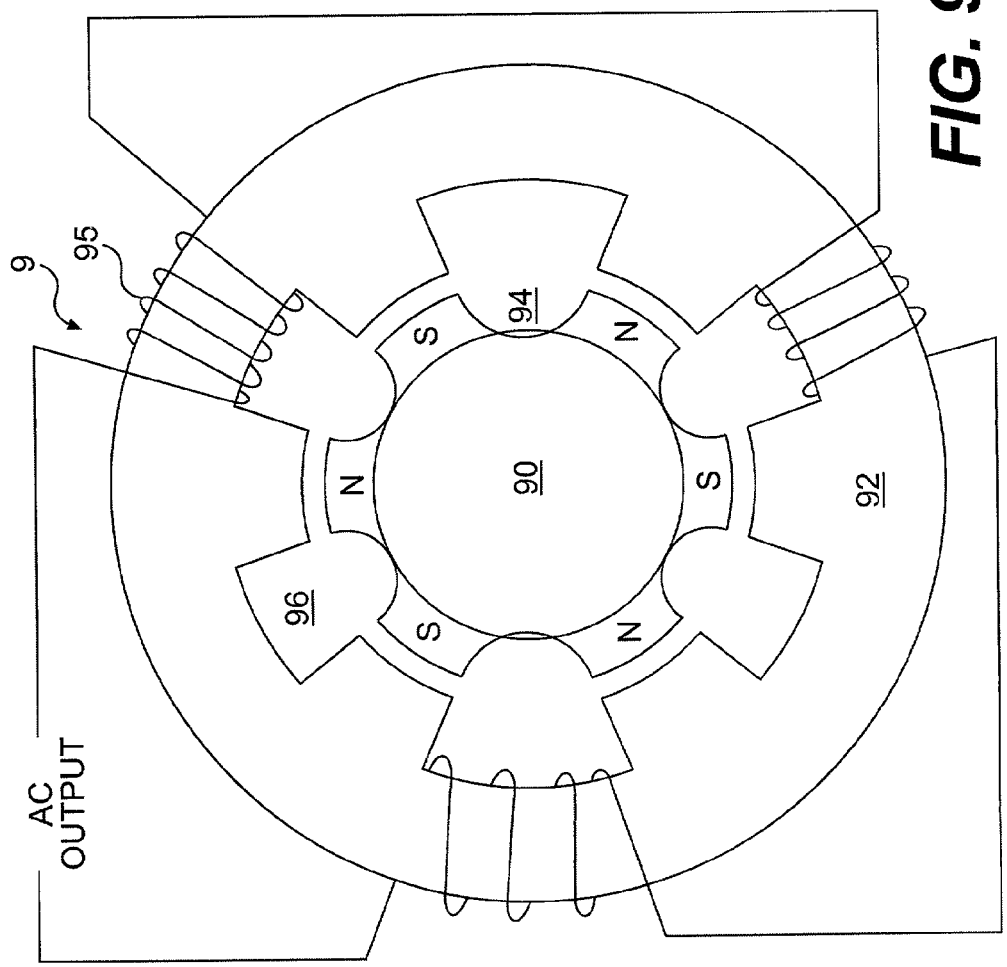
FIG. 9 is a schematic diagram of an A.C. toroidally wound stator generator with three stator coils and a six pole rotor in accordance with a preferred embodiment of the invention.

FIG. 9 illustrates another embodiment of the invention. A generator 9 has a six pole rotor 90 located within a stator core 92. Rotor 90 has an outer periphery including six outer slots 94. Similarly, stator core 92 has an inner periphery which includes six inner slots 96. Three stator windings 98 are wound around three of the six inner slots 96 of the stator core 92. As with the embodiments described above, one of ordinary skill in the art can optimize the A.C. output by varying, for example, the number of inner and outer slots, stator windings, or poles. Generator 9 also provides for a greater amount of stator windings 98 per unit area while maintaining a relatively large air gap between rotor 90 stator core 92.

Figure 10:
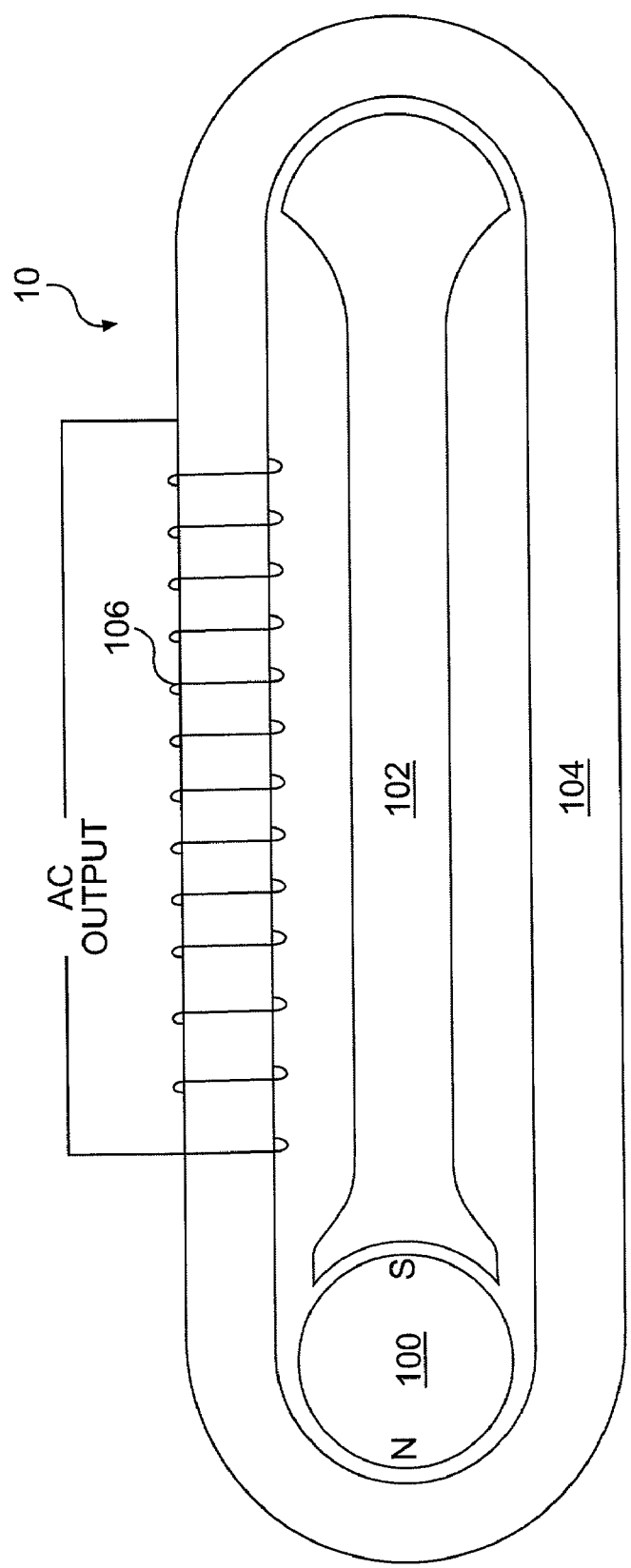
FIG. 10 is a schematic diagram of an A.C. toroidally wound stator generator with a single stator coil and a two pole rotor in accordance with a preferred embodiment of the invention.

Another preferred embodiment is illustrated in FIG. 10. A generator 10 includes a stator core 104 having a substantially oval configuration. A two pole rotor 100 and a rotor core 102 are located within stator core 104. Rotor 100 is positioned adjacent one end of stator core 104. Rotor core 102 includes two ends, one of which is placed adjacent rotor 100 and has a shape substantially similar to rotor 100, and the other end having a shape substantially similar to the end of stator core 104 opposite rotor 100 and adjacent stator core 104. A stator winding 106 is wound about a portion of stator core 104. Preferably, stator winding 106 is wound substantially around a center portion of stator core 104. As with the above embodiment, one of ordinary skill in the art may produce a desired result by, for example, changing the number of stator windings or rotors. Furthermore, an increased amount of stator windings 106 per unit area may be provided while maintaining a relatively large air gap between rotor 100 stator core 104.

Figure 11:
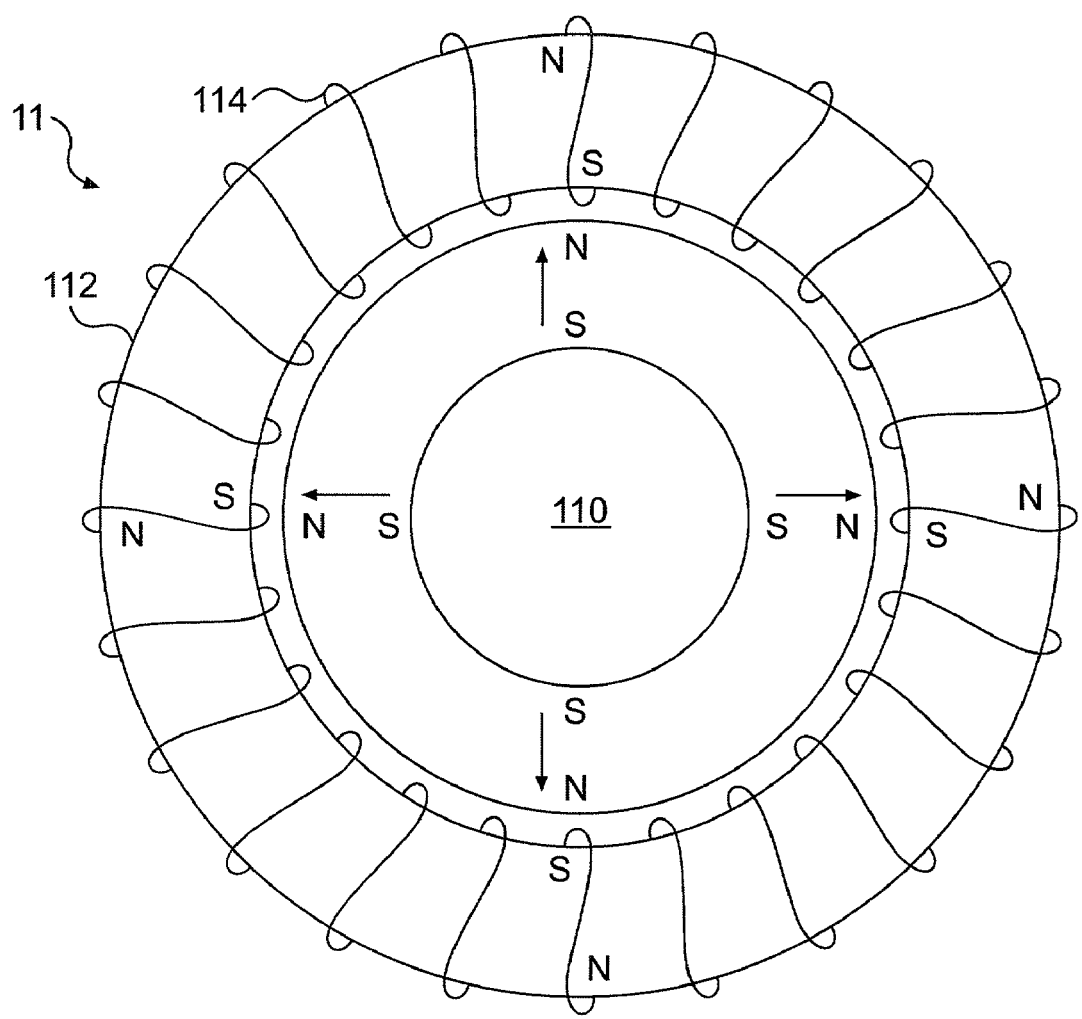
FIG. 11 is a schematic diagram of a D.C. toroidally wound stator generator in accordance with another preferred embodiment of the invention.

FIG. 11 illustrates another embodiment of a DC generator. In this embodiment, generator 11 includes a radially magnetized rotor 110 within a radially magnetized stator core 112. Stator windings 114 are toroidally wound about stator core 112. The polarity of rotor 110 and stator core 112 may depend on the direction of the rotation of rotor 110. One of ordinary skill in the art may produce a desired result by, for example, providing an additional outer rotor or stator winding.

Figure 12:
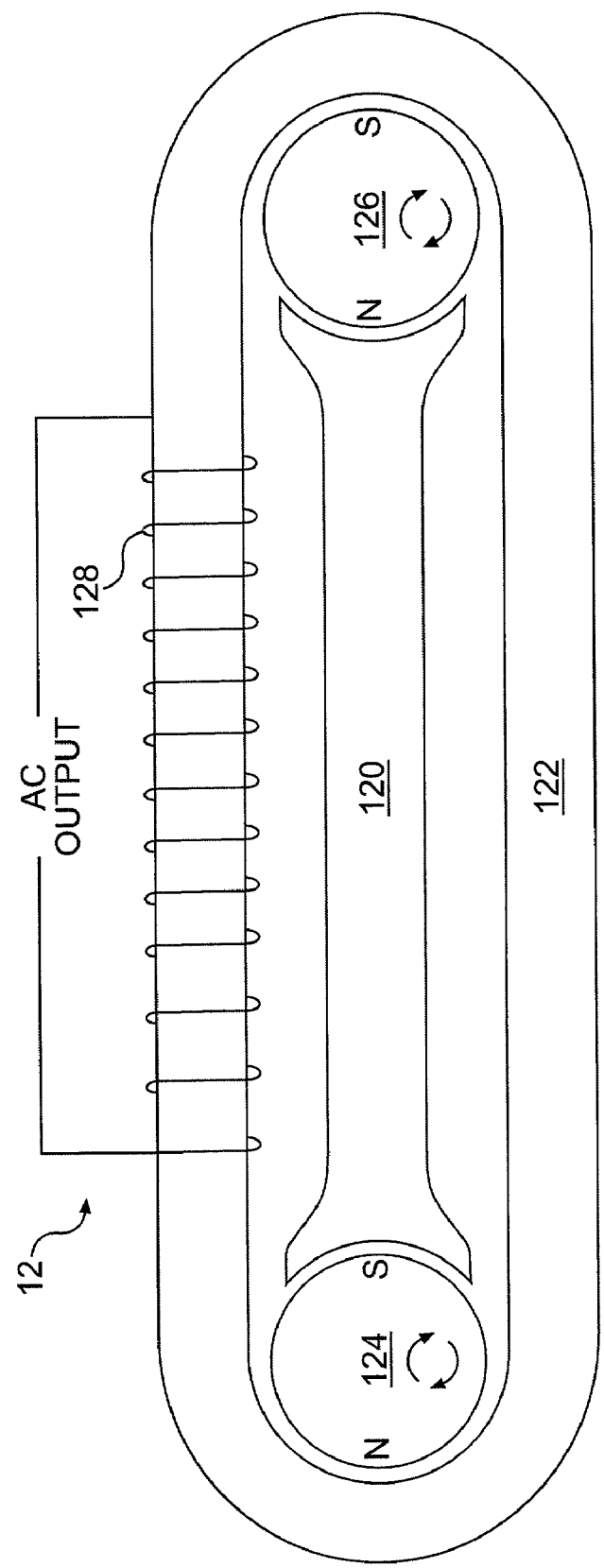
FIG. 12 is a schematic diagram of an A.C. toroidally wound stator two-pole two-rotor generator in accordance with a preferred embodiment of the invention.

FIG. 12 shows a two-pole two-rotor embodiment of the invention. A generator 12 has a rotor pole 120 positioned within a stator 122. Rotors 124 and 126 are located at each end of rotor pole 120. The ends of rotor pole 120 are of a shape substantially equivalent to rotors 124 and 126. A stator coil 128 is toroidally wound about at least a portion of stator 122. Rotors 124 and 126 rotate such that the poles of each rotor are in synch. As the north pole of rotor 124 becomes aligned with rotor pole 120, the south pole of rotor 126 becomes aligned with rotor pole 120. This maintains a completed path for the magnetic flux field of the entire system.

The invention may also be used as a transformer. Self-synchronous devices are known. A self-synchronous device has a primary winding which is used as a field winding for a rotor. The device has the appearance of a wound-rotor three-phase induction motor. The device may be used as a differential synchro and normally operates as a single-phase transformer with a stator as the secondary. Thus, although designed as a three-phase induction motor, the device is operated as a transformer when used as a differential synchro. The same can be said of the instant invention in that the generator, although designed as an electrical generator, may be operated as a single-phase transformer. In this configuration, the rotor is static and a wound rotor has applied an alternating or AC input creating the required time rate change of magnetic flux needed to induce a current into the secondary or stator winding. There is a lack of reflected impedance in this type of transformer which is analogous to the lack of counter torque for the generator embodiment of the invention.

Figure 13:
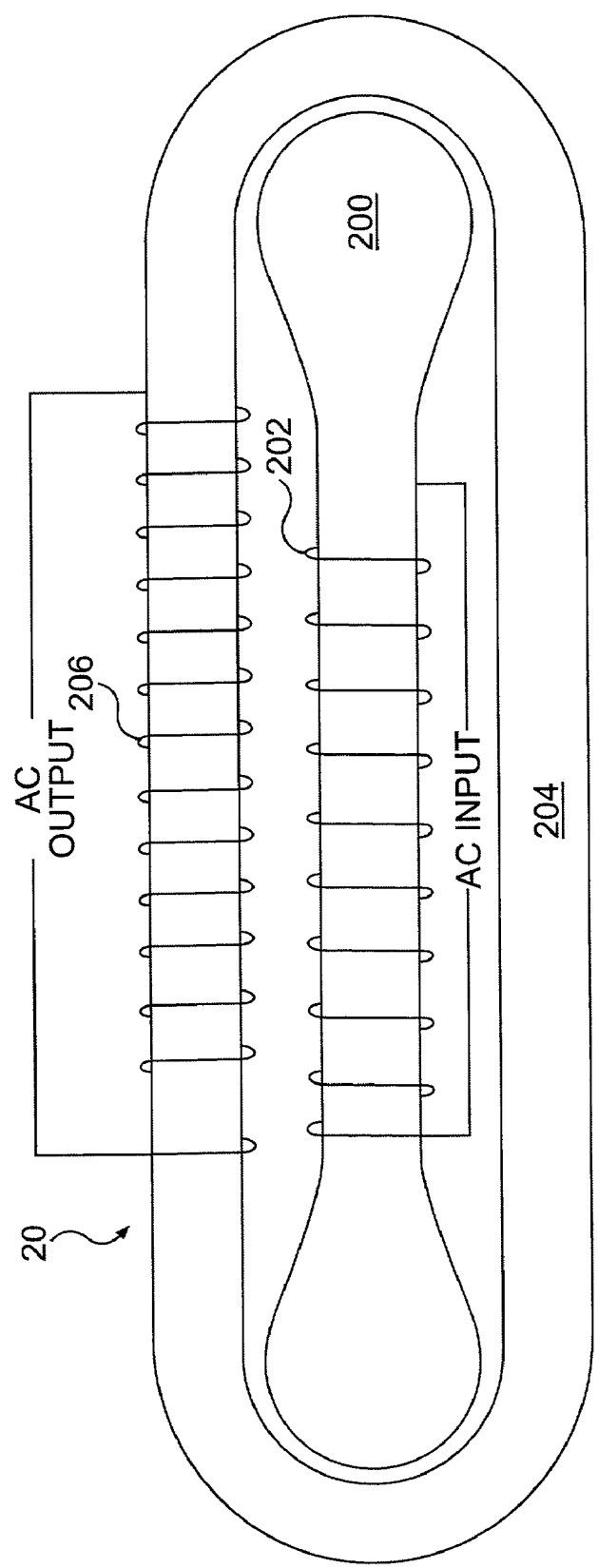
FIG. 13 is a schematic diagram of a transformer in accordance with a preferred embodiment of the invention.

FIG. 13 illustrates a transformer in accordance with one embodiment of the invention. A transformer 20 includes a primary core 200 having a primary coil 202 toroidally wound thereon. Primary core 200 is located within a secondary core 204. Secondary core 204 has a secondary coil 206 toroidally wound about at least a portion thereof. Due to the arrangement of primary coil 202 and secondary coil 206, the flux field produced by secondary coil 206 is trapped and therefore, reduces the amount of reflected impedance. Because primary core 200 does not rotate as in a generator, the air gap between primary core 200 and secondary core 204 may be reduced.

Figure 14:
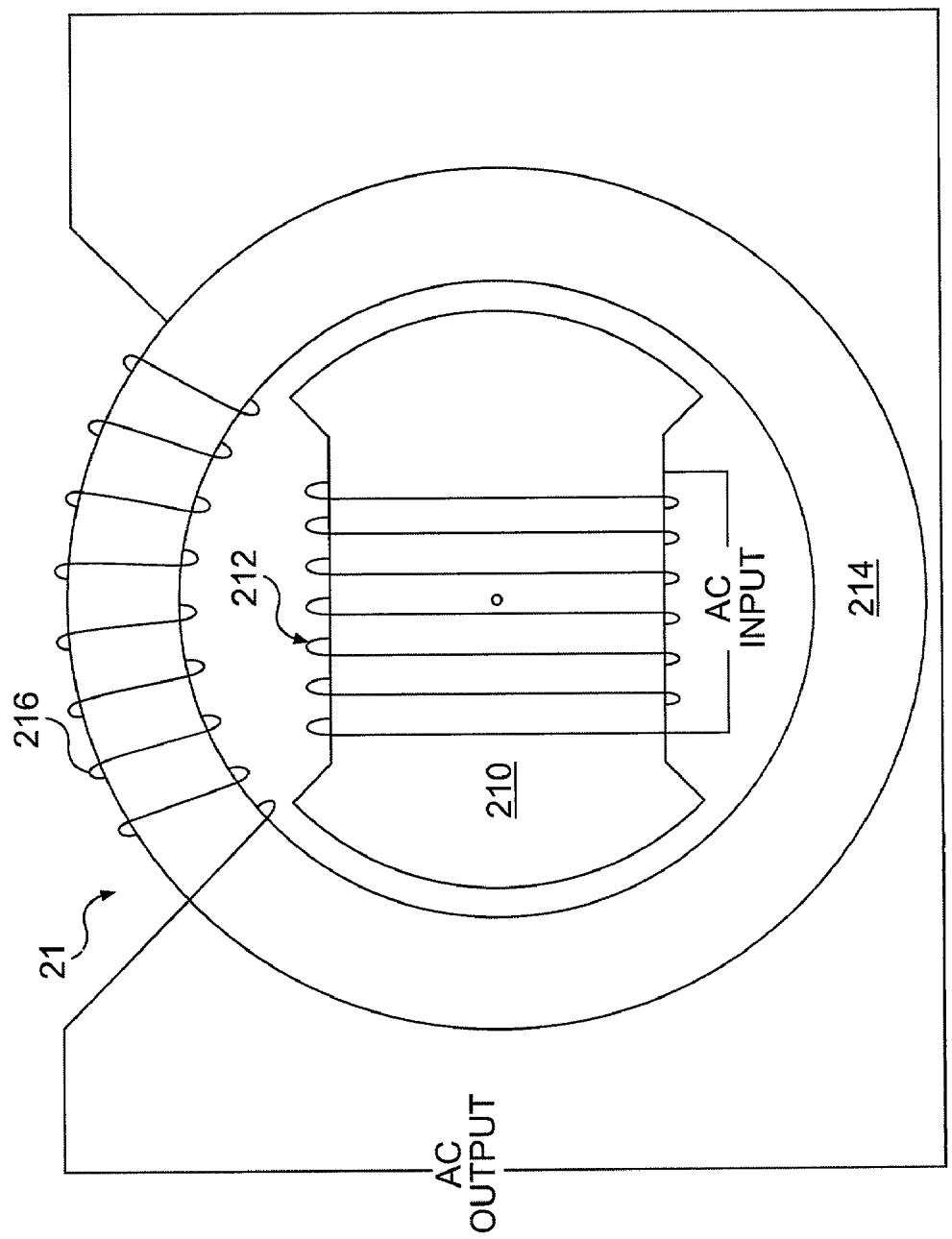
FIG. 14 is a schematic diagram of a transformer in accordance with another preferred embodiment of the invention.

Another transformer embodiment is illustrated in FIG. 14. A transformer 21 includes a primary core 210. Primary core 210 includes a primary coil 212 toroidally wound about at least a portion thereof. A secondary core 214 has a secondary coil 216 toroidally wound thereon and is in a stretched toroidal core configuration. Secondary core 214 at least partially surrounds primary core 210. As in transformer 20, transformer 21 reduces the amount of reflected impedance because the magnetic flux field generated by secondary coil 216 is not linked to the flux field produced by primary coil 212. One of ordinary skill in the art will recognize that modifications may be made to the transformer embodiments without changing the scope of the invention (e.g., varying the number of primary and secondary coils).

Figure 15:
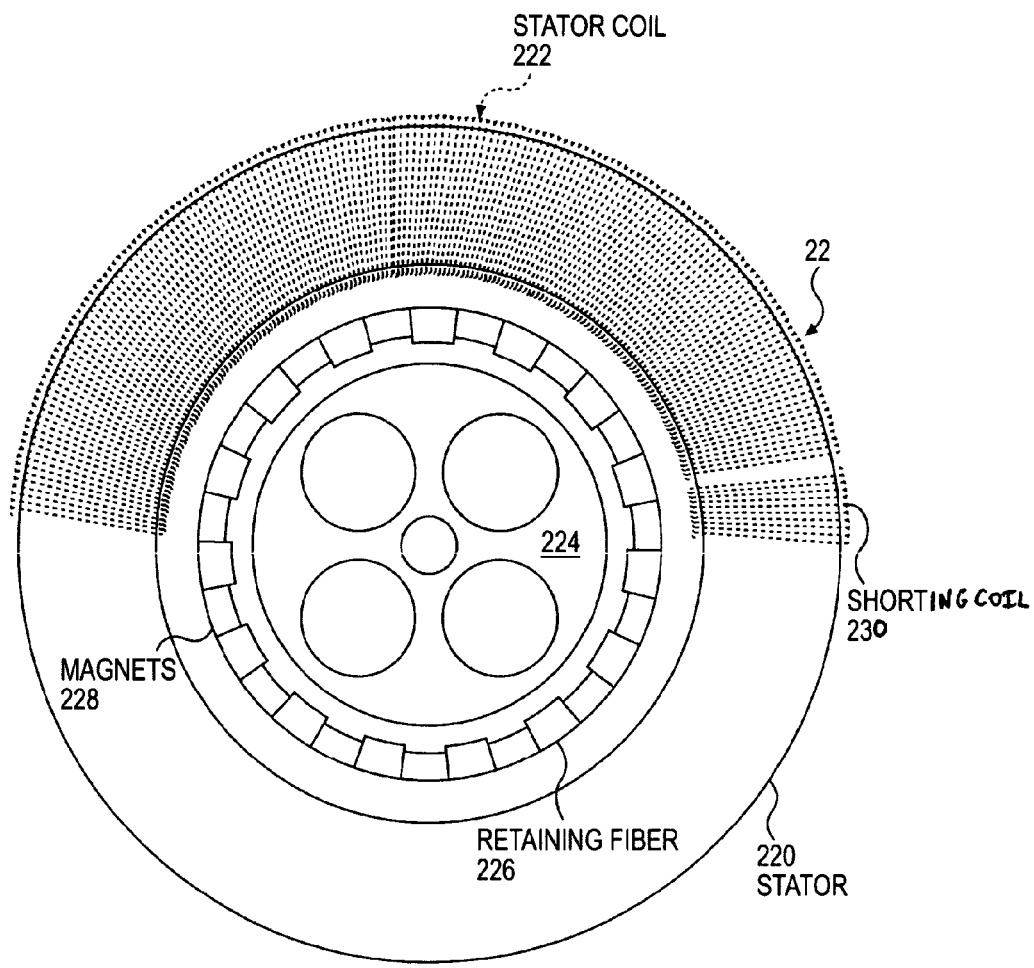
FIG. 15 is a schematic diagram of a toroidally wound stator A.C. generator in accordance with a preferred embodiment of the invention.

FIG. 15 illustrates an A.C. generator 22 comprising a stator 220 with toroidally wound stator coils 222, a rotor 224, and a retaining fiber 226 comprising a plurality of magnets 228. Retaining fiber 226 preferably comprises a high tensile strength material (e.g., carbon fiber) that maintains contact between rotor 224 and magnets 228.

A shorting coil 230 is wound about a portion of stator 220 and connected to itself. Shorting coil 230 may be used to increase the operational efficiency of generator 22. Shorting coil 230 changes the operational point of generator 22 as shown on a graph plotting magnetic field intensity (H) versus flux density (B) (i.e., a B-H curve). The operational point is changed because the saturation level of stator 222 increases with the application of the shorting coil and prevents the terminal voltage from dropping to unusable levels thus stabilizing the terminal voltage. Shorting coil 230 acts as a capacitor that creates a capacitive reactance that is in parallel with the inductive reactance of stator 220. The capacitive reactance of shorting coil 230 counters the inductive reactance of stator 220 and increases the operational efficiency of generator 22.

The degree of change in the operational point of the generator may be partially based on the number of windings of shorting coil 230. As the number of shorting coil windings increases, the greater the degree of change in the operational point. Additionally, current flow through shorting coil 230 may be adjusted by applying a series resistance thereto. Furthermore, a D.C. bias (either positive or negative) may be applied to shorting coil 230 to vary the operational characteristics of the generator as desired. Also, shorting coil 230 may be wound in a particular direction depending on a desired result.

It is to be understood that shorting coil may also be used in a D.C. generator. As shown in FIG. 15, stator coils 222 are wound around substantially half of stator 220. In a D.C. generator embodiment, another stator coil 222 may be wound around substantially the remaining portion of stator 220. One or more diodes may be connected to one or both stator coils 222 to extract either a positive or negative pulse from each stator coil 222, thus creating a D.C. generator. Those of ordinary skill in the art will know when to extract either positive or negative pulses from stator coils 222 based on the intended use of the generator.

Figure 16:
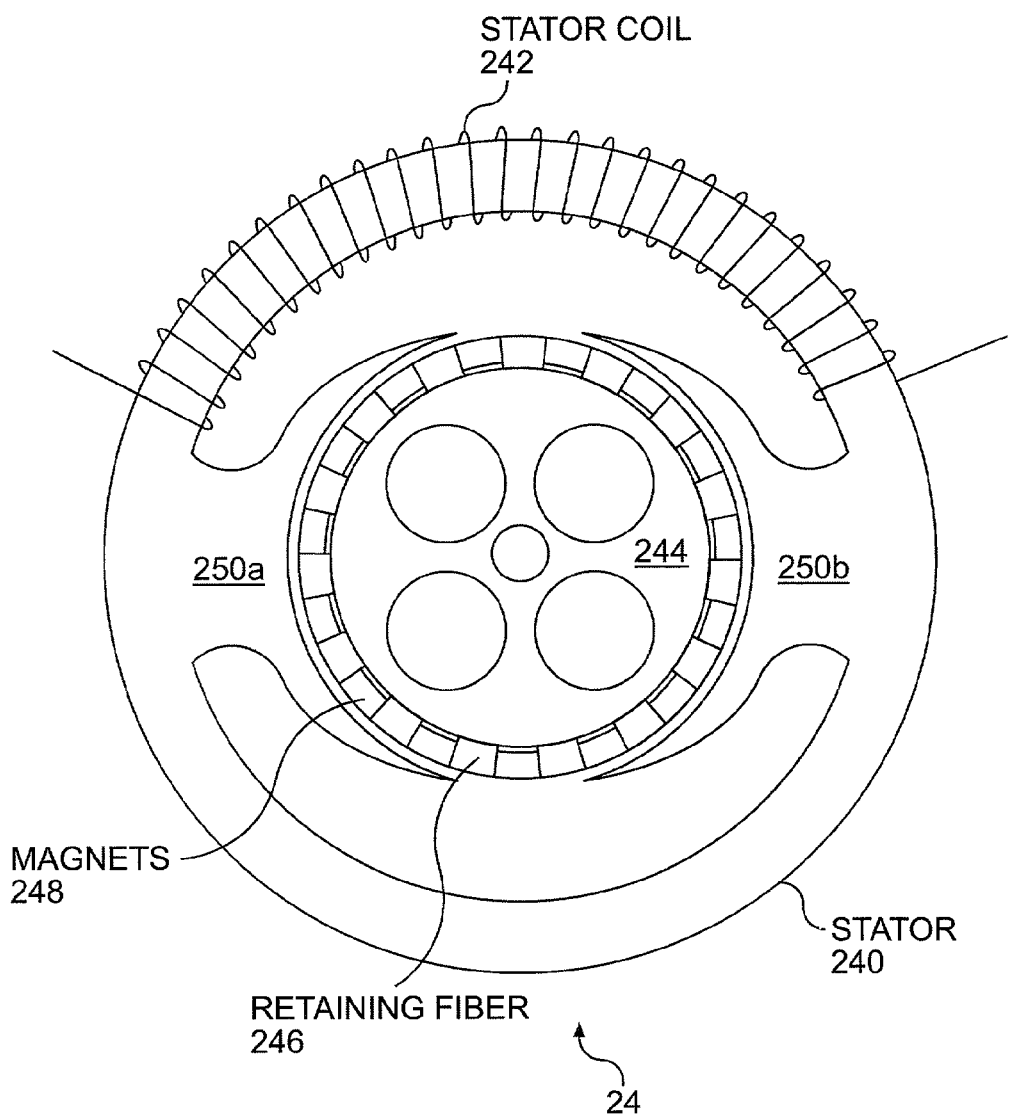
FIG. 16 is a schematic diagram of a toroidally wound stator A.C. generator in accordance with a preferred embodiment of the invention.

FIG. 16 illustrates an A.C. generator 24 in accordance with another embodiment of the invention. Generator 24 comprises a stator 240 having a stator coil 242 toroidally wound about at least a portion thereof and extended pole piece faces 250a, 250b, a rotor 244, and a retaining fiber 246 comprising a plurality of magnets 248. Extended pole piece faces 250a, 250b may be used to trap a greater amount of flux within stator 240. As flux passes from stator 240 to rotor 244, a portion of the flux may "cut" across stator coil 242. Extended pole piece faces 250a, 250b may be used to guide flux from stator 240 to rotor 244. Extended pole piece faces 250a, 250b operate to increase the amount of flux changes within generator 24 and reduce the amount of flux that cuts across stator coil 242.

As described with reference to FIG. 15, stator 240 may also comprise stator windings wound about the unwound portion as shown in FIG. 16. Diodes may be provided in line with the windings to reduce the amount of flux escaping stator 240. Additional stator windings may be used to produce a DC pulse output that may then be filtered and inverted to produce a desired frequency (e.g., 50 Hz, 60 Hz, etc.).

According to another embodiment of the invention, open portions of a rotor may be filled with magnetic material, preferably iron. Filling open portions of the rotor may assist in reducing undesirable flux leakage from the rotor. By trapping substantially all of the flux within the rotor, interaction between rotor and stator flux is reduced. In this manner, counter torque is reduced thereby increasing the overall efficiency of the device.

EXAMPLE

A prototype of this embodiment was constructed using a standard 10,000 watt gas-powered generator. The stator was removed from the generator and its housing. The stator windings were removed from the stator and rewound by hand using a No. 10 size copper wire with 180 winds wrapped in a toroidal fashion around approximately 180 degrees of the stator. Because the stator housing could not accommodate the toroidally wound stator windings, the housing was cut to remove the portions of the housing adjacent the stator windings. The stator was then reinstalled in the modified housing and re-attached to the gas powered generator. A standard 12 volt car battery was attached to the input of the rotor. A 12.92 volt input with 0.8 Amps was measured as the input to the rotor. The output was measured as 6.5 volts with a 40 Amp output. A series of input and output measurements were taken for various inputs and are listed in the following table.

| Voltage In (Volts) | Voltage Out (Volts) | Current In (Amperes) |
|---|---|---|
| 0 | 0 | 0 |
| 2 | 3.1 | 0.08 |
| 4 | 8.7 | 0.2 |
| 6 | 13.9 | 0.3 |
| 8 | 17.8 | 0.41 |
| 10 | 21.8 | 0.53 |
| 12 | 24.4 | 0.63 |
| 14 | 27.5 | 0.74 |
| 16 | 29.4 | 0.88 |
| 18 | 30.6 | 0.99 |
| 20 | 31.2 | 1.1 |
| 22 | 31.7 | 1.21 |
| 24 | 32.6 | 1.34 |
| 26 | 33.2 | 1.43 |
| 28 | 33.2 | 1.52 |
| 30 | 33.2 | 1.61 |
| 32 | 34.7 | 1.87 |
| 34 | 35.0 | 1.87 |
| 36 | 35.3 |  |
| 38 | 35.6 | 2.2 |
| 40 | 35.9 | 2.28 |
| 42 | 35.6 | 2.33 |

Although the invention has been described in detail with respect to preferred embodiments thereof, it will be apparent to those skilled in the art that variations and modifications can be effected in these embodiments without departing from the spirit and scope of the invention. For example, the rotor magnets may be formed from either permanent magnets or electromagnets, the stator may have beveled edges for the stator windings, the directional rotation of rotor may be altered (e.g., by rotating the rotor ninety (90) degrees), or the windings may be electrically commutated to allow for more windings.

What is claimed is:

1. A DC electromagnetic generator device comprising:
   a radially magnetized rotor within a radially magnetized toroidal magnetic stator core;
   at least one toroidal winding section toroidally wound about at least a portion of said magnetic stator core, and having an output terminal;
   an input shaft; and
   a permanent magnet mounted to said input shaft for rotating said rotor, said input shaft and said rotor being located substantially within said stator, and whereby a magnetic field generated by said permanent magnet rotor passes through said toroidal winding section and onto said radially magnetized toroidal magnetic stator;

wherein said at least one toroidal winding section extends into one but not both of a north pole or a south pole of said stator's magnet, such that the coils of said stator winding structure are exposed to a moving magnetic flux field of either a north pole or south pole of said rotor at any instant in time such that one or more magnetic flux fields generated by said stator winding extend in the same direction within said stator core, whereby essentially all of the magnetic flux fields generated by the toroidal winding section are confined within said toroidal stator core such that there is essentially no magnetic field leaving the magnetic stator core;

said magnetic stator core, winding section and permanent magnet being configured to generate electrical power.

2. The electromagnetic device as claimed in claim 1, wherein the device includes exactly one toroidal winding section.

3. The electromagnetic device as claimed in claim 1, wherein the permanent magnet has an outer region comprising only a north pole, and an inner region comprising only a south pole.

4. The electromagnetic device as claimed in claim 1, further comprising a shorting coil wound about at least a portion of said magnetic stator core which, upon application of a bias voltage, varies an operational characteristic of the device.

5. The electromagnetic device as claimed in claim 4 wherein one or more diodes are connected to the at least one toroidal winding section and the shorting coil to extract a positive or negative pulse from each coil.

* * * * *